United States Patent [19]

Marx

[11] 4,194,731

[45] Mar. 25, 1980

[54] GAS SPRING AND METHOD OF FILLING THE SAME

[75] Inventor: Thomas O. Marx, Rockton, Ill.

[73] Assignee: Atwood Vacuum Machine Company, Rockford, Ill.

[21] Appl. No.: 971,424

[22] Filed: Dec. 20, 1978

[51] Int. Cl.² ............................ F16F 5/00; B65B 3/04
[52] U.S. Cl. .................................... 267/65 R; 141/4; 267/120; 267/124
[58] Field of Search .................... 16/58, 66, 84; 141/4; 188/322; 267/65 R, 120, 124

[56] References Cited

U.S. PATENT DOCUMENTS

| | | | |
|---|---|---|---|
| 2,518,097 | 8/1950 | Thornhill | 267/65 R |
| 3,366,379 | 1/1968 | McNally | 267/65 R |
| 3,837,445 | 9/1974 | Pierle | 188/322 |
| 4,098,302 | 7/1978 | Freitag | 267/64 R X |
| 4,131,139 | 12/1978 | Tanabe | 141/4 |

FOREIGN PATENT DOCUMENTS

| | | | |
|---|---|---|---|
| 1151410 | 7/1963 | Fed. Rep. of Germany | 188/322 |
| 2447012 | 4/1976 | Fed. Rep. of Germany | 267/65 R |
| 2659846 | 11/1977 | Fed. Rep. of Germany | 267/65 R |
| 2757232 | 7/1978 | Fed. Rep. of Germany | 267/65 R |
| 573275 | 11/1945 | United Kingdom | 267/65 R |
| 1187599 | 4/1970 | United Kingdom | 267/124 |
| 443214 | 7/1975 | U.S.S.R. | 267/65 R |

Primary Examiner—Wm. Carter Reynolds
Attorney, Agent, or Firm—Leydig, Voit, Osann, Mayer & Holt, Ltd.

[57] ABSTRACT

A gas spring comprising a cylinder having a closed end and an open end with the rod of a piston projecting into the cylinder through the open end and a sealing assembly surrounding the rod adjacent the open end of the cylinder and normally sealing the interior of the cylinder from the surrounding atmosphere. The sealing assembly includes an annular resilient sealing member having surfaces which are in sealing engagement with the rod and the inner wall of the cylinder and a plurality of protuberances are formed on the inner wall of the cylinder and are located inwardly of the normal position of the sealing member. When the open end of the cylinder is placed in communication with a gas under pressure, the gas moves the sealing member into engagement with the protuberances so that openings are formed between the member and the inner wall of the cylinder and the gas flows into the cylinder through these openings. When the pressure source is removed, the pressurized gas in the cylinder forces the sealing member back to its normal position and, in this position, the member seals the interior of the cylinder from the outside.

6 Claims, 4 Drawing Figures

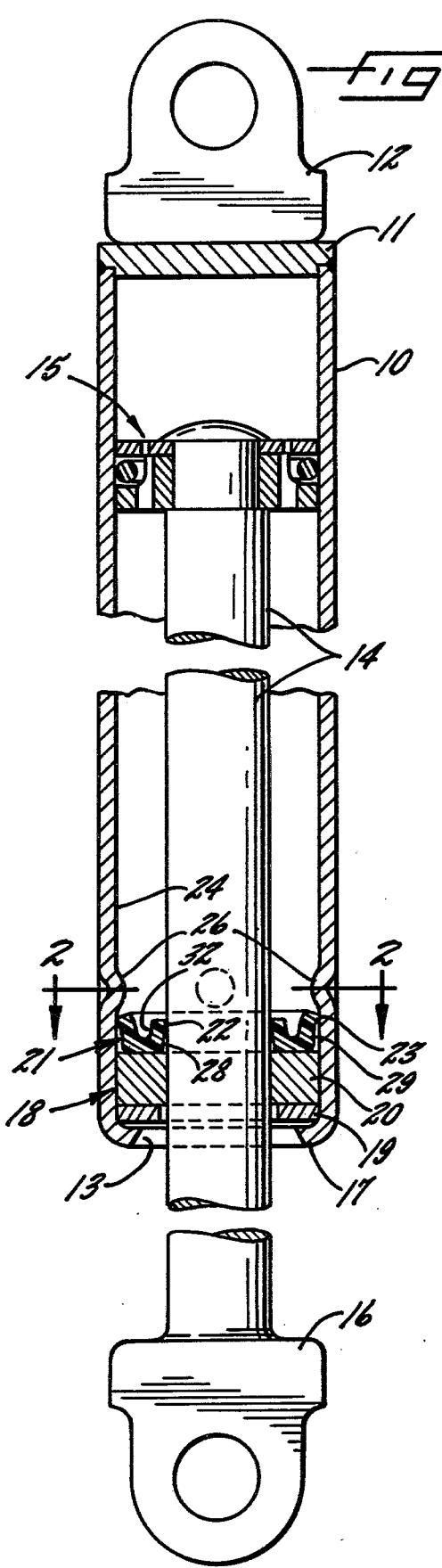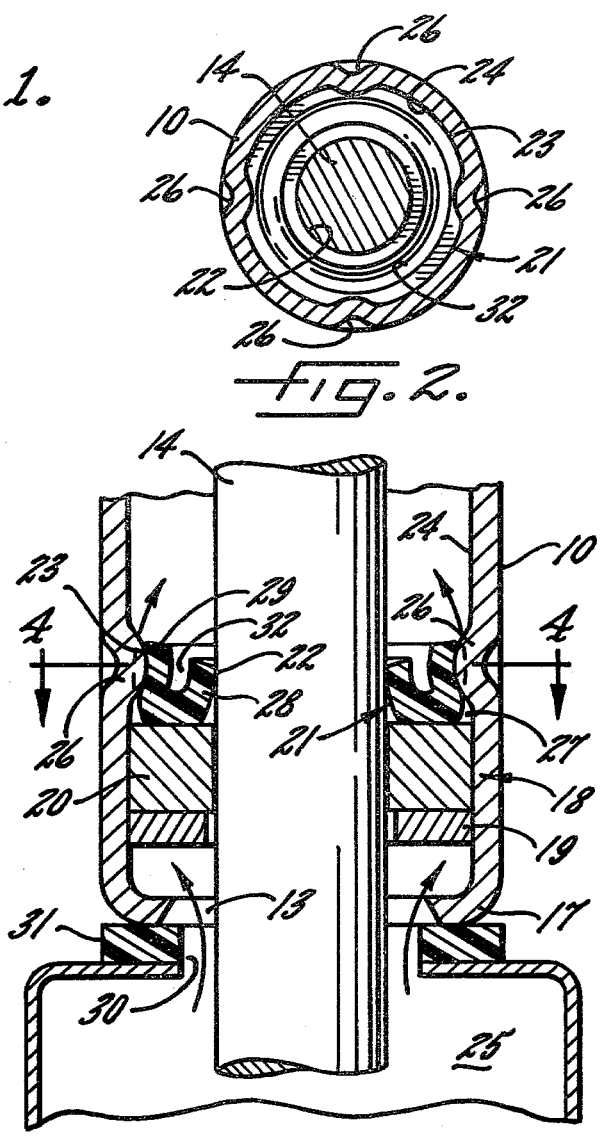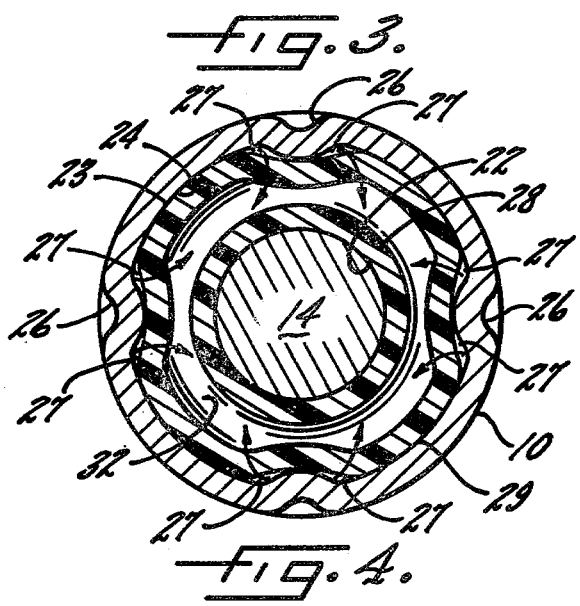

4,194,731

GAS SPRING AND METHOD OF FILLING THE SAME

BACKGROUND OF THE INVENTION

This invention relates to a gas spring of the type comprising a cylinder which is closed at one end and open at the other and having a piston slidable in the cylinder and connected to a rod which projects into the cylinder through the open end thereof. The open end of the cylinder is sealed by a sealing assembly including an annular flexible member which normally is in sealing engagement with the rod and with the inner wall of the cylinder. In the cylinder is a quantity of oil and a gas under pressure.

SUMMARY OF THE INVENTION

The general object of the invention is to provide a new and improved gas spring which may be filled with gas under pressure simply by placing the open end of the cylinder in communication with a source of pressurized gas.

A more detailed object is to achieve the foregoing by providing the inner wall of the cylinder with at least one protuberance which is spaced inwardly from the normal position of the sealing member and which, when gas under pressure is admitted into the cylinder through its open end, is engaged by the sealing member so that the latter is flexed to provide openings between the member and the inner wall on either side of the protuberance and gas flows past the sealing member and into the cylinder.

The invention also resides in the novel method of filling a gas spring.

BRIEF DESCRIPTION OF THE DRAWINGS

FIG. 1 is a longitudinal cross-sectional view of a gas spring embodying my invention.

FIG. 2 is a sectional view taken along the line 2—2 in FIG. 1.

FIG. 3 is an enlarged fragmentary sectional view similar to FIG. 1 but showing the parts in a moved position and illustrating the use of a source of gas under pressure.

FIG. 4 is a sectional view taken along the line 4—4 in FIG. 3.

DETAILED DESCRIPTION OF THE PREFERRED EMBODIMENT

As shown in the drawings for purposes of illustration, the invention is embodied in a gas spring of the type conventionally used to hold open a deck lid, a hatch back or the like of an automotive vehicle. The gas spring includes an elongated hollow cylinder 10 closed at one end by a cover 11 welded to the cylinder and supporting a bracket 12 which serves as a connection for one end of the spring. The opposite end of the cylinder is open as indicated at 13 and an elongated rod 14 coaxial with the cylinder projects through this open end and into the cylinder. On its inner end, the rod supports a piston assembly 15 which is slidable in the cylinder and may be of any conventional construction such as shown in Skubal U.S. Pat. No. 4,108,423. A bracket 16 formed integrally on the outer end of the rod constitutes the connection for the other end of the gas spring.

An inturned flange 17 on the lower end of the cylinder 10 supports a sealing assembly 18 through which the rod 14 projects and which seals the open end of the cylinder. As is customary in gas springs, the interior of the cylinder contains a quantity of oil and a gas under pressure, the gas usually being an inert gas such as nitrogen. Herein, the sealing assembly comprises a washer 19 normally abutting the flange 17, a rigid metallic annulus or cylinder 20 resting on the washer and an annular flexible and resilient sealing member 21 supported on the cylinder 20. The sealing member 21 may be made of a material such as rubber and includes an inner annular surface 22 which is in sealing engagement with the rod 14 around the entire circumference thereof. An outer annular surface 23 formed on the sealing member engages the inner wall 24 of the cylinder 10 around the entire circumference of the wall thereby sealing the interior of the cylinder from the atmosphere while permitting the rod 14 to slide in the assembly 18 as the piston assembly 15 moves back and forth in the cylinder.

In accordance with the present invention, the gas spring is constructed and arranged in a novel manner so that the cylinder 10 may be filled with a gas under pressure by simply placing the open end 13 in communication with a source 25 (FIG. 3) of pressurized gas and, when the source is moved out of communication with the open end, the sealing assembly 18 automatically is operable to prevent escape of gas from the interior of the cylinder. To this end, one or more protuberances 26 are formed on the inner wall 24 of the cylinder inwardly of the normal position of the sealing assembly and, when the open end 13 is connected to the pressure source 25, the sealing member 21 moves axially inwardly and into engagement with the protuberance to form openings 27 (FIG. 4) between the member 21 and the wall 24 so that gas from the source flows through the openings and into the cylinder. When the pressure source is disconnected, the pressure of the gas in the cylinder forces the sealing assembly back to the open end so that the sealing member no longer engages the protuberance and is in sealing engagement with the wall 24. The invention also resides in the novel method of filling the cylinder.

In the present instance, there are four protuberances 26 formed as indentations in the cylinder 10 and equally spaced around the latter, the indentations being generally round or semi-spherical in shape. The sealing member or ring 21 is U-shaped in cross-section to provide inner and outer cylindrical legs or flanges 28 and 29. The surface 22 which engages the rod 14 is formed on the inner side of the flange 28 and the outer surface 23 is on the outside of the flange 29. While the pressure source 25 may take various forms such as a chamber which is filled with pressurized nitrogen and in which the gas spring is placed for filling, it is shown herein as a tank filled with nitrogen and having an outlet 30 surrounded by a seal ring 31. The latter is sized to abut the flange 17 at the rod end of the cylinder 10 to seal the connection between the outlet 31 and the open end 13 of the cylinder. The outlet of the tank 25 may be controlled by any suitable valving (not shown) for starting and stopping the flow of nitrogen out of the tank through the outlet.

With the foregoing arrangement, the desired quantity of oil is placed in the cylinder 10 as the gas spring is assembled and the parts are placed in their normal position as shown in FIG. 1 with the washer 19 abutting the flange 17 of the cylinder, the metal cylinder 20 resting on the washer, and the sealing ring 21 seated on the metal cylinder. In this condition, the ring 21 is spaced from the indentations 26 so that surfaces 22 and 23 are respectively in full sealing engagement with the rod 14 and the inner wall 24 of the cylinder. To fill the cylinder with nitrogen under pressure, the flange 17 on the cylinder is placed against the seal 31 on the tank 25 so that the tank outlet 30 communicates with the opening 13 in the rod end of the cylinder and pressurized nitrogen is permitted to flow from the tank through the outlet and the opening and into the adjacent end of the cylinder. The nitrogen first causes the sealing assembly 18 to slide axially on the rod away from the open end of the cylinder 10 and this brings the flange 29 on the sealing ring 21 into engagement with the indentations 26 as illustrated in FIG. 3. Thus, as shown in FIG. 4, the portions of the flange 29 which engage the indentations are flexed radially inwardly and this leaves the openings 27 between the flange and the inner wall 24 on both sides of each indentation. As a result, as indicated by the arrows in FIGS. 3 and 4, nitrogen from the tank 25 flows into the cylinder, alongside the inner wall 24 at the outsides of the washer 19 and the metal cylinder 20 and into the interior of the cylinder 10 through the openings 27. This flow is continued until the pressure of the nitrogen reaches a preselected level which may be any level customarily used in the gas spring art.

When the preselected pressure level is reached, the tank 25 is disconnected from the flange 17 whereby the washer 19 is exposed to atmospheric pressure which is considerably less than the pressure of the nitrogen within the cylinder 10. As a result, the pressure within the cylinder forces the sealing assembly 18 back to its normal position against the flange 17 and, in this position, the surface 23 on the flange 29 of the sealing ring 21 no longer engages the indentations 26 and is in full sealing engagement with the inner wall 24 around the entire circumference thereof. The effectiveness of the sealing ring 21 is enhanced by the provision of the flanges 28 and 29 which leaves an annular space 32 between the flanges whereby the pressurized gas in the cylinder exerts radial forces on the flanges to hold the surfaces 22 and 23 firmly in engagement with the rod 14 and the wall 24 respectively.

I claim:

1. A gas spring comprising, an elongated hollow cylinder having a closed end and an open end, a piston disposed within said cylinder, an elongated rod coaxial with said cylinder with a portion projecting into the cylinder through said open end and connected to said piston, at least one protuberance formed on the inner wall of said cylinder and spaced from said open end, an annular sealing member made of a flexible material and encircling said rod, said member normally being disposed between said protuberance and said open end, a first annular surface formed on said member and engaging said rod around its complete circumference thereby to form a seal between the member and the rod, and a second annular surface formed on said member and normally engaging the inner wall of said cylinder around the entire circumference thereof thereby to form a seal between the member and said wall, said member being operable when said open end communicates with a source of gas under pressure to move axially into engagement with said protuberance and forming openings between said second surface and said inner wall adjacent said protuberance whereby gas may flow through said openings and into the interior of said cylinder, the gas within said cylinder being operable when said source is removed from said open end to move said member toward the open end and out of engagement with said protuberance whereby said member seals the interior of said cylinder from said open end.

2. A gas spring as defined in claim 1 in which a plurality of protuberances are formed on said inner wall and are equally spaced around the wall and in which openings are formed adjacent each of said protuberances when the latter are engaged by said sealing member.

3. A gas spring as defined in claim 2 in which said protuberances are indentations in said cylinder.

4. A gas spring as defined in claim 1 in which said sealing member includes an integral generally cylindrical flange projecting axially from the periphery of said member and away from said open end and in which said second surface is formed on said flange.

5. A gas spring comprising, an elongated hollow cylinder having a closed end and an open end, a piston disposed within said cylinder, an elongated rod coaxial with said cylinder with a portion projecting into the cylinder through said open end and connected to said piston, a plurality of protuberances formed on the inner wall of said cylinder and spaced from said open end, said protuberances being equally spaced around said inner wall, a sealing ring made of a flexible material and encircling said rod, said ring normally being disposed between said protuberances and said open end, inner and outer generally cylindrical flanges of flexible material formed integrally with said ring and projecting axially away from said open end, a first annular surface formed on said inner flange and engaging said rod around its complete circumference thereby to form a seal between said ring and the rod, and a second annular surface formed on said outer flange and normally engaging the inner wall of said cylinder around the entire circumference thereof thereby to form a seal between said ring and said wall, a rigid annulus disposed in said cylinder between said ring and said open end and supporting said ring, said ring and said annulus being operable when said open end communicates with a source of gas under pressure to move axially and engage said outer flange with said protuberances thereby to form openings between said second surface and said inner wall adjacent said protuberances whereby gas may flow through said openings and into the interior of said cylinder, the gas within said cylinder being operable when said source is removed from said open end to move said ring and said annulus toward the open end and disengage said outer flanges from said protuberances whereby said ring seals the interior of said cylinder from said open end.

6. The method filling a gas spring with a gas under pressure wherein the gas spring comprises a cylinder open at one end and closed at the other end, a rod coaxial with and projecting into the cylinder through the open end thereof, an annular sealing member made of a flexible material and surrounding the rod to be normally in sealing engagement both with the rod and the inner wall of the cylinder, and at least one protuberance projecting inwardly from said inner wall on the side of said member opposite said open end, said method comprising the steps of connecting the open end of said cylinder with a source of gas under pressure thereby to move said sealing member into engagement with said protuberance and move a portion of the member away from said inner wall to create an opening between said open end and the interior of the cylinder, retaining the connection between said source and said open end to permit gas to pass through opening until the gas within the cylinder reaches a preselected pressure, and thereafter disconnecting said open end from said source whereby the gas under pressure moves said sealing member toward said open end and out of engagement with said protuberance with the member in sealing engagement with said inner wall.

* * * * *